2,727,871

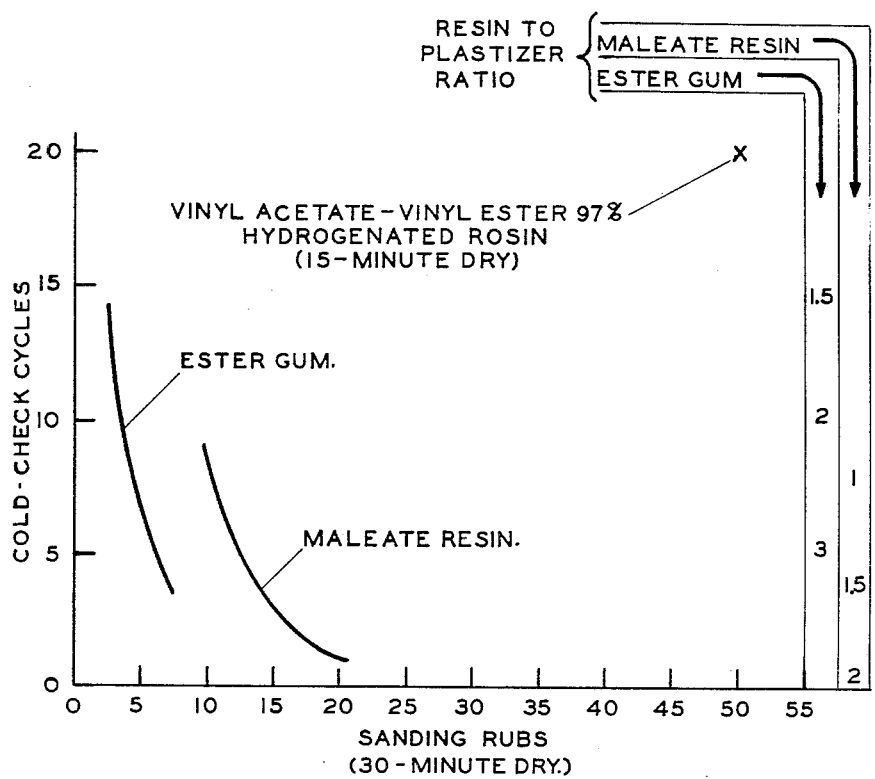
FLEXIBILITY-HARDNESS CHARACTERISTICS
OF HARD LACQUER RESINS.
WALTER SHADE ROPP.
INVENTOR.
BY Ernest G. Peterson

United States Patent Office 2,727,871
Patented Dec. 20, 1955

RESINOUS COPOLYMER OF VINYL ACETATE AND A VINYL ESTER OF A HYDROGENATED OR DE-HYDROGENATED ROSIN ACID

Walter S. Ropp, Wilmington, Del., assignor to Hercules Powder Company, Wilmington, Del., a corporation of Delaware Application July 5, 1951, Serial No. 235,138

11 Claims. (Cl. 260—27)

This invention relates to new polymeric materials and, more particularly, to copolymers of vinyl acetate and a vinyl ester of a chemically stabilized rosin acid. It also relates to a process for the preparation thereof.

The copolymer of vinyl acetate and the vinyl ester of rosin has been suggested. British Patent 395,478, for example, states in its broad disclosure that such copolymers may be formed. No instance of the actual preparation of such a copolymer has been found in the literature, however. One reason is the fact that the vinyl ester of rosin is exceedingly sluggish in polymerization with vinyl acetate. The weaker types of peroxide polymerization catalysts have practically no effect on the reaction. The stronger types of peroxide catalysts, while they effect some copolymerization of the monomers, are productive only of low yields of low molecular weight compounds. They are also characterized by poor color. Hence, the polymerization of the vinyl ester of rosin with vinyl acetate is not attractive.

It has now been found unexpectedly that the vinyl esters of a rosin acid wherein the rosin acid radical is stabilized chemically have quite different properties as compared with the vinyl esters of rosin in forming copolymers with vinyl acetate. Chemical stabilization as used herein includes both hydrogenation and dehydrogenation. Both of these treatments as applied to rosin and certain rosin compounds are well-known to the art. The vinyl esters of rosin with which this invention is concerned are accordingly the vinyl esters of a hydrogenated rosin acid and the vinyl esters of a dehydrogenated rosin acid.

According to this invention, it has been found that vinyl esters of chemically stabilized rosin acids copolymerize with vinyl acetate in the presence of a peroxide catalyst with ease as compared with the related vinyl ester of rosin and vinyl acetate. When comparatively strong peroxide catalysts are used in conjunction with the vinyl esters of chemically stabilized rosin acids in the preparation of copolymers of the instant invention, exceptionally high yields of polymer are obtained as contrasted with the low yields of polymer resulting when the vinyl ester of rosin is used as one of the monomers. The vinyl esters of at least 80% hydrogenated rosin acids can be copolymerized with vinyl acetate in substantial yield even using comparatively weak peroxide polymerization catalysts such as benzoyl peroxide. This is in marked contrast to the reaction of the vinyl ester of rosin in this copolymer with vinyl acetate in the presence of these catalysts. When the vinyl ester of rosin is used as one of the monomers, as has been previously stated, it is practically unaffected by peroxide polymerization catalysts of the type of benzoyl peroxide. Regardless of whether weak or strong polymerization catalysts are used, the copolymers of the invention have substantially higher molecular weights than do copolymers prepared from the vinyl ester of rosin and vinyl acetate under identical conditions. Other advantageous properties are higher softening point, greater hardness, etc. When used in nitrocellulose lacquers, the copolymers of the invention impart excellent color stability, hardness, and flexibility.

The copolymers of vinyl esters of chemically stabilized rosin acids and vinyl acetate are formed by contacting the monomers with a catalyst which produces free radicals. The copolymerization is preferably effected by contacting the desired monomers with a peroxide polymerization catalyst at a suitable temperature. Another effective procedure involves subjecting the desired monomers to ultraviolet light with or without the use of a suitable activator such as biacetyl, acetone, etc. Still another effective procedure involves merely heating the desired monomers in bulk at a temperature of at least about 200° C.

The following examples illustrate the preparation of the copolymers of vinyl esters of chemically stabilized rosin acids and vinyl acetate in accordance with this invention. They should not be considered as limiting the invention, however, but merely as specific embodiments of the broad concept. All parts are by weight unless otherwise specified.

EXAMPLE 1

A glass polymerization vessel was charged with 75 parts of vinyl acetate, 75 parts of vinyl ester of 97% hydrogenated rosin, and 0.75 part (0.5%) of benzoyl peroxide. The vessel was sealed with a metal cap containing a Buna N rubber liner. The bottle was alternately evacuated with an aspirator and pressured to 10 lb. with nitrogen three times. The vessel and contents were heated at 50° C. for 48 hours and at 80° C. for 3 hours. The solid polymer was dissolved in 320 parts of acetone and precipitated by pouring into 2170 parts of stirred ethanol. The plastic mass was dried by alternately heating to 80° C. and evacuating. When it no longer swelled under vacuum it was dried for 24 hours at 70° C. and 20 mm. The weight of the polymer was 136.23 parts, representing a conversion of 91% of the monomers to the polymer. It was clear, hard, and colorless. The specific viscosity of a 1% solution of the resin in benzene was 0.792. It had a drop softening point of 187.5° C.

A lacquer was prepared from 40 parts of this resin, 50 parts of chlorinated rubber of 20 cp. (at 25° C. in 20% solution in toluene) and 10 parts of dibutyl phthalate, all dissolved in toluene at 15% solids. On testing for hardness, this lacquer passed two and five pound print resistance tests and on testing for flexibility it passed 20 cold-check cycles on unsealed maple panels. Thus, the lacquer had excellent print resistance and flexibility.

A second lacquer was prepared from 40 parts of this resin, 40 parts of RS nitrocellulose of ½-sec. viscosity and 20 parts of dibutyl phthalate. It was sprayable at 16.4% solids in a mixture of 50% toluene, 20% butyl acetate, 10% ethyl acetate, 10% butanol, and 10% ethanol. The lacquer was then tested for hardness, flexibility and color stability. It passed 50 double sanding rubs in 15 minutes, 20 cold-check cycles, and 2 and 5 pound print resistance tests. Exposure to a carbon arc for 100 hours produced considerably less yellowing than a similarly formulated lacquer containing a rosin-based hard resin as a control. In the accompanying figure, this lacquer is compared to lacquers prepared from two of the large volume lacquer resins, ester gum and maleated ester gum (referred to in the figure as "maleate resin").

In the figure are plotted data for flexibility as measured by cold-check tests against data for relative sanding hardness at the end of 30 minutes' drying time. The two curves shown give a direct comparison of the balance between flexibility and sanding hardness characteristics for the two resins commonly used in lacquer formulations. The solids for each lacquer contained 40% of RS nitrocellulose of ½-sec. viscosity, and 60% combined resin:plasticizer. The range of resin:plasticizer proportions covered was different for each resin, with the proportions being varied as shown on the scales at the right of the chart in the figure. The percentages of resin and plasticizer for any point on any one curve may be readily found by projecting a horizontal line from the point of interest to its corresponding point on the proper resin:plasticizer scale.

The solvent used in applying the lacquer solids was the same as that used in the second lacquer in Example 1 and consisted of a mixture of 50% toluene, 20% butyl acetate, 10% ethyl acetate, 10% butanol, and 10% ethanol.

The properties of the second lacquer in Example 1, which has the same formulation as the control resins except for the difference in resin, are indicated in the figure for purposes of comparison. It should be noted that the lacquer of Example 1 was tested after only fifteen minutes' drying time, while the control lacquers were tested after thirty minutes' drying time. It should be noted that the curves for the control resins represent points of failure of the lacquer, i. e., after the number of double sanding rubs and cold-check cycles represented by any given point on the curve, the lacquer failed. On the other hand, even after twenty-cold-check cycles, the lacquer using the copolymer of the instant invention showed no checking or cracking and the sandpaper was not clogged even after the fifty double sanding rubs. It is at once apparent that the lacquer using the copolymer of the instant invention is very substantially superior to the lacquers formed from the prior art resins.

EXAMPLE 2

A Pyrex glass polymerization vessel was charged with 20 parts of vinyl acetate and 20 parts of vinyl ester of 97% hydrogenated rosin. The vessel was chilled in a bath of Dry Ice-acetone and evacuated to 0.1 mm. with a mechanical pump. The vessel was sealed in vacuo and placed 5 inches from a mercury vapor 125-watt ultraviolet light for 24 hours. The polymer was dissolved in 32 parts of methyl ethyl ketone and precipitated from 320 parts of ethanol. The polymer was dried as in Example 1. The weight was 21.96 parts (representing 55% conversion). It elongated at 200° C. but did not drop soften at 250° C. The specific viscosity of a 1% solution in benzene was 0.937.

EXAMPLE 3

To a glass autoclave was added 600 parts of distilled water containing 1 part of dissolved polyvinyl alcohol and a monomer-catalyst mixture consisting of 50 parts of vinyl acetate, 50 parts of vinyl ester of 97% hydrogenated rosin, 40 parts of acetone and 0.1 part (0.1%) of benzoyl peroxide. The glass autoclave was fitted with a reflux condenser, separatory funnel, glass true bore stirrer, and a gas inlet tube. The top of the reflux condenser was fitted with a T-tube so that nitrogen could be by-passed during the reaction. The glass autoclave was flushed with nitrogen and then nitrogen by-passed through the T-tube. The mixture was stirred and a 125-watt mercury vapor ultraviolet light placed 5 inches from the reactor. After 21 hours the 0.5 to 3 mm. polymeric balls were filtered and washed with 1000 parts of tap water and then with 200 parts of distilled water. The weight of polymer was 98.73 parts. They were dried for 19 hours at 65° C. in a vacuum oven at 20 mm. The weight was 94.62 parts (95% conversion). The balls fused to a white, hard mass during the drying process. The specific viscosity of a 1% solution of the polymer in benzene was 0.458 and the drop softening point 172° C.

EXAMPLE 4

Into a glass polymerization vessel was measured 75 parts of vinyl acetate, 75 parts of vinyl ester of 80% hydrogenated rosin, and 0.75 part of benzoyl peroxide. The vessel was sealed and flushed as in Example 1. It was heated for 70 hours at 50° C. and 5 hours at 80° C. The contents of the vessel were poured into 1200 parts of ethanol. The vessel was rinsed with 8 parts of acetone and this added to the ethanol. The polymer was dried as in Example 1. The weight of the polymer was 39 parts (26% conversion). The specific viscosity of a 1% solution in benzene was 0.175 and the drop softening point was 126° C.

EXAMPLE 5

A Pyrex glass polymerization vessel was charged with 315 parts of vinyl acetate, 1185 parts of vinyl ester of dehydrogenated rosin (The dehydrogenated rosin in this case was one derived from rosin by heating with a palladium catalyst in the absence of added substances capable of reducing the unsaturation of the rosin. It had a dehydroabietic acid content of about 45% and an abietic-type resin acid content of about 0%.) and 20 parts of di-tert-butyl peroxide. The vessel was sealed under vacuum as in Example 2. The vessel and contents were heated for 17.5 hours at 100° C. and then for 51 hours at 125° C. The solid polymer was dissolved in benzene and precipitated by pouring into stirred ethanol. The polymer was dried as in Example 1. The weight was 930 parts (representing 62% conversion). The specific viscosity of a 1% solution of the resin in benzene was 0.063. It had a drop softening point of 133° C.

EXAMPLES 6–15, INCLUSIVE

The following polymerizations were carried out as in Example 2. The catalyst for the first five was 1% benzoyl peroxide and for the last five 0.5% benzoyl peroxide. Examples 10 and 11 were heated for 37 hours at 50° C. The remainder were heated for 24 hours at 50° C. All examples were further heated for 3 hours at 80° C. The monomers in each case were vinyl acetate and the vinyl ester of 97% hydrogenated rosin.

Table I

| Example | Vinyl Acetate (Percent) | Polymer Solvent | Precipitant | Conversion (Percent) | Drop Softening Point, °C. | 1% Specific Viscosity (Benzene) |
|---|---|---|---|---|---|---|
| 6 | 0 | Benzene | Ethanol | 83 | 170.0 | 0.125 |
| 7 | 10 | do | do | 86 | 171.0 | 0.193 |
| 8 | 20 | Methyl ethyl ketone | do | 92 | 161.0 | 0.260 |
| 9 | 30 | do | do | 85 | 168.8 | 0.352 |
| 10 | 40 | do | do | 81 | 172.5 | 0.462 |
| 11 | 50 | do | do | 80 | 194.5 | 0.777 |
| 12 | 60 | do | Methanol | 52 | 152.5 | 0.427 |
| 13 | 70 | do | do | 46 | 168.5 | 0.627 |
| 14 | 80 | do | Hexane | 51 | 160.5 | 0.618 |
| 15 | 90 | do | do | 54 | 198.5 | 0.863 |

As may be seen from the foregoing examples, the ratio of the monomers may be varied over a wide range in the preparation of the copolymers in accordance with this invention. Copolymers with monomer ratios varied from 10:90 to 90:10 are shown. Other ratios may be used depending on the properties desired. The properties of these copolymers differ from those of either homopolymer, although they vary with composition. With increasing vinyl ester of chemically stabilized rosin acid content they exhibit decreased water sensitivity and alcohol solubility, but increased solubility in aliphatic hydrocarbon solvents such as hexane, heptane, and mineral spirits. All of the copolymers are soluble in aromatic hydrocarbon solvents such as benzene and toluene. These properties are illustrated by the data in Table II.

Table II

| Vinyl Acetate to Vinyl Ester of 97% Hydrogenated Rosin Acid Ratio | Toluene (50%) | Mineral Spirits (50%) | Ethanol (50%) | Water Time to Soften Film |
| --- | --- | --- | --- | --- |
| 10:90 | Sol | Sol | Insol | >48 hrs. |
| 20:80 | Sol | Sol | Insol | >48 hrs. |
| 30:70 | Sol | Sol | Insol | 62 min. |
| 40:60 | Sol | Hazy | Insol | 47 min. |
| 60:40 | Sol | Insol | Insol | 33 min. |
| 70:30 | Sol | Insol | Hazy | 14 min. |
| 90:10 | Sol | Insol | Hazy | 11 min. |

From this table it can be seen that from the standpoint of resistance to water, it is desirable to have no more than about 20% vinyl acetate, while for resistance to alcohol the vinyl acetate content of the copolymer may be increased to about 60%.

For a given drop softening point of the resins of the invention the viscosity in solution increases with increasing vinyl acetate content. For example, a copolymer containing 20% vinyl acetate had a viscosity of 4 stokes in 50% solution in toluene and a drop softening point of 161° C. A copolymer having the same drop softening point but containing 80% vinyl acetate had a viscosity of 40 stokes in 50% solution in toluene.

The copolymers of the invention are tougher than the homopolymer of vinyl ester of a chemically stabilized rosin acid and exhibit compatibility with certain film-formers with which the homopolymer is incompatible. Thus, the copolymer containing 40% vinyl acetate or more is compatible with low viscosity nitrocellulose, glyceryl phthalate alkyd resins and chlorinated rubber. The homopolymer of vinyl ester of a chemically stabilized rosin acid is incompatible with all of these film-formers.

From the standpoint of compatibility with linseed oil, the copolymer containing 10% vinyl acetate is preferred. At 0% vinyl acetate a temperature of 290° C. is needed to obtain a clear pill with linseed oil. On forming a copolymer with 10% vinyl acetate, the temperature needed to obtain a clear pill with linseed oil is reduced to 170° C. On continuing to increase the percentage of vinyl acetate in the copolymer, the temperature needed to obtain a clear pill with linseed oil also increases so that for a 50:50 copolymer it is 230° C. and for 90% vinyl acetate it is impossible to obtain a clear pill at any temperature.

The polymerization may be carried out in bulk, solution, suspension, and emulsion. The catalysts for the reaction are those which produce free radicals. Benzoyl peroxide is used in most of the examples but other catalysts such as potassium persulfate, di-tert-butyl peroxide, tert-butyl perbenzoate, di-cumyl peroxide, cumene hydroperoxide, or lauroyl peroxide may be used. The range of catalyst concentration is about 0.05 to 5% with 0.1 to 1% preferred. These, of course, would require different temperatures for maximum effectiveness depending on their rate of decomposition. With benzoyl peroxide the range is 20° to 100° C., with 50° to 80° C. being the preferred range. Ultraviolet light is quite effective for initiating the polymerization. Activators such as acetone, biacetyl, or di-tert-butyl peroxide which are split into free radicals by ultraviolet light may be used with it. The polymerization may also be carried out by merely heating the desired monomers in bulk at a temperature of at least about 200° C.

The vinyl esters of rosin acids of various degrees of hydrogenation can be used in accordance with this invention. In general, the vinyl esters of any of the prior are hydrogenated rosin acids may be employed. It is preferred, however, to employ the vinyl ester of a hydrogenated rosin acid which is at least 40% saturated with hydrogen and which hydrogenated rosin acid has a content of abietic-type resin acids of not over 10%. It is further preferred to use a rosin acid which is at least 80% saturated with hydrogen. A rosin acid which is at least 80% saturated with hydrogen has a content of abietic-type resin acids of substantially zero. The copolymer of vinyl acetate with vinyl ester of an at least 80% hydrogenated rosin acid may be prepared in substantial yield with such relatively weak peroxide catalysts as benzoyl peroxide whereas relatively strong peroxide catalysts such as di-tert-butyl peroxide are needed to obtain satisfactory yields when vinyl esters of less highly hydrogenated rosin acids are used. Also, copolymers of vinyl acetate and vinyl ester of at least 80% hydrogenated rosin may be obtained which are colorless.

The per cent conversion to polymer and the drop softening point increase with increasing per cent of hydrogenation of the rosin acids. For these reasons it is most preferred to have the rosin as completely hydrogenated as it is commercially feasible to make it. The following data for 50 weight per cent copolymers prepared with 0.5% benzoyl peroxide catalyst using a heating cycle of 70 hours at 50° C. and 5 hours at 80° C. illustrate this point:

Table III

|  | Drop Softening Point (° C.) | 1% Specific Viscosity (benzene) | Conversion (1%) |
| --- | --- | --- | --- |
| Vinyl ester of 97% hydrogenated rosin | 187.5 | 0.792 | 91 |
| Vinyl ester of 80% hydrogenated rosin | 126.0 | 0.175 | 26 |

In describing the invention the term "rosin acid" has been employed. The term "rosin acid" is here used in a generic sense to include both commercial rosins, which are known to contain a neutral body fraction as well as a rosin acid fraction, and the rosin acid fractions obtained therefrom. Thus, there is included wood rosin, gum rosin, and the substantially entirely acidic fractions obtained therefrom as by distillation, combined saponification and extraction processes, etc. It is well known, too, that the acidic fraction contained in wood or gum rosin is a mixture of isomeric resin acids which include abietic, levopimaric, dextropimaric, neoabietic, isodextropimaric, etc., acids. Such specific compounds are equivalent to the naturally occurring mixtures found in wood or gum rosin and the term "rosin acid" is intended to be inclusive thereof. However, from an economic standpoint, the naturally occurring wood or gum rosin or acid fractions thereof are preferred. The term "resinate" is used to denote the salts of the rosin acids herein described.

The hydrogenated rosin acids employed in accordance with this invention may be made by any of the known procedures for hydrogenating rosin acids. As examples thereof, there may be mentioned the procedures of U. S. 2,094,117 and U. S. 2,155,036. Other procedures which are of interest are those described in U. S. 2,174,651; U. S. 1,973,865; U. S. 2,113,808; and U. S. 2,346,793.

"Per cent saturation with hydrogen" as applied to any particular sample of hydrogenated rosin acid means $$\frac{100\% \times \text{No. of g. of } H_2 \text{ absorbed per 100 g. of the initial rosin acid in preparing the sample}}{\text{No. of g. of } H_2 \text{ absorbed per 100 g. of the initial rosin acid in preparing a completely saturated rosin acid}}$$

A "completely saturated rosin acid" is one prepared under such strenuous conditions of hydrogenation that substantially all of the ethylenic double bonds contained in the starting rosin acid are saturated with hydrogen. The analytical procedure used to effect complete saturation of a rosin acid is described in detail infra.

As has been indicated by the data in Table III, a substantially completely hydrogenated rosin acid is rather unique in so far as this invention is concerned in that vinyl esters thereof copolymerize with ease to give very high conversions to polymers even in the presence of small amounts of relatively weak peroxide catalysts as benzoyl peroxide.

As stated above, it is preferred that the hydrogenated rosin acid employed have a content of abietic-type resin acids of not over 10%. By "abietic-type resin acids" there is meant the class of resin acids having the carbon skeleton of abietic acid; i. e.,

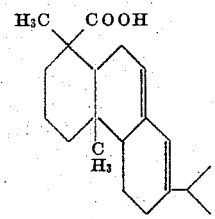

and having two ethylenic double bonds per molecule. Resin acids falling in this class are abietic acid, levopimaric acid and neoabietic acid.

The dehydrogenated rosin acids used in accordance with this invention may be prepared according to known procedures. As exemplary of known procedures of dehydrogenating rosin acids there are mentioned the heating of rosin acid for one to two hours at 150° C. to 200° C. with a dehydrogenation catalyst such as iodine or sulfur, in the amount of 0.5 to 4% of the rosin acid. Dehydrogenated rosin acids may also be produced by what is known in the art as the "disproportionation" reaction. A disproportionated rosin acid is a rosin acid that has been treated with an active hydrogenation catalyst under conditions of reaction adapted to produce an intra- and intermolecular rearrangement of the hydrogen atoms in the rosin acids contained therein and in the absence of added substances capable of reducing the unsaturation of the rosin acid under the conditions of treatment. Such disproportionated rosin acids have a substantial proportion of dehydrogenated acidic constituents and are properly regarded as dehydrogenated rosin acids. See in this connection U. S. 2,154,629 to Littmann. Other materials which are properly classed as dehydrogenated rosin acids and which can be used as such in accordance with this invention are pyroabietic acid which is rich in dehydroabietic acid, etc. It may be prepared by heating a rosin acid for one to four hours at 260°–315° C. The pseudopimaric acid which is described in U. S. 2,072,628 is similarly suitable.

The above-described procedures for preparing dehydrogenated rosin acids provide products having a rather wide variety of degrees of dehydrogenation. It will be understood in this connection that the rosin acids present in wood and gum rosin are substantially entirely isomeric compounds possessing the empirical formula $C_{20}H_{30}O_2$. These isomers possess two ethylenic double bonds per molecule. Upon subjection to the known dehydrogenation processes a proportion of the isomeric acids lose two atoms of hydrogen and it is believed that the resulting three ethylenic bonds arrange themselves in the form of the most stable configuration, the benzene ring. Such acids have the empirical formula $C_{20}H_{28}O_2$ and are commonly referred to as "dehydroabietic acid." Obviously, the content of dehydroabietic acid of a dehydrogenated rosin acid is a measure of the degree of dehydrogenation of the original rosin acid.

As explained above, rosin acids having a variety of degrees of dehydrogenation result from the procedures for dehydrogenation described in the art. In general, any of the prior art dehydrogenated rosin acids may be employed in practicing this invention. It is preferred, however, to employ one having a dehydroabietic acid content of at least 40% and having an abietic-type resin acid content of not over 10%. It is still further preferred to employ a dehydrogenated rosin acid having a content of abietic-type resin acids of substantially 0%.

The copolymers of this invention are tougher than conventional low molecular weight hard resins. They can replace conventional hard resins in lacquers and inks with greatly improved results. In nitrocellulose lacquers the copolymer exhibited excellent color and color retention, excellent solvent release and cold-check resistance. In chlorinated rubber based lacquers they exhibit an excellent balance of print and cold-check resistance. The compatibility and stabilizing influence of the copolymer in chlorinated rubber lacquer systems, especially those applied to wood, are excellent. Other uses are as rotogravure inks and sanitary white paints. The copolymer in emulsion form may be applied to paper or cloth as a stiffening agent or to improve water or grease resistance.

The analytical method referred to supra for quantitatively completely hydrogenating a rosin acid is the following. This method effects removal of all unsaturation of the rosin acid existing due to the presence of carbon-carbon double bonds and aromatic nuclei.

The method consists of reducing a suspension of platinum oxide in acetic acid to platinum black in an atmosphere of hydrogen, adding a weighed sample of the rosin acid to the catalyst suspension and measuring the amount of hydrogen absorbed by the rosin acid.

The reagents employed are (1) acetic acid, empyreuma-free (passing dichromate test), (2) platinum oxide catalysts of the type described by Voorhees and Adams, J. A. C. S., 44, 1397 (1922) and by Adams and Shriner, J. A. C. S., 45, 2171 (1923), and (3) commercial hydrogen.

The apparatus employed included a gas measuring buret, a reaction flask, and a magnetic stirrer. The gas buret employed is that described by C. R. Noller and M. R. Barusch, Industrial and Engineering Chemistry, anal. ed., vol. 14, 907 (1942) with the exceptions (1) there is a T and stopcock between the reaction flask (B) and the calibrated section of the buret (A) so that air may be removed and hydrogen admitted by alternate evacuation and filling and (2) there is a 25 ml. reservoir just below the calibrations of said section. The reaction flask employed is similar to that of Noller et al. except that in place of the side arm with cup it has a side arm fitted with a ground glass stopper. The stopper end (within the flask) is so made as to permit a sample cup placed thereon to drop to the bottom of the flask when the stopper handle is turned 90 degrees.

Remove the side arm of the reaction flask and weigh in 0.10±0.01 g. PtO catalyst. Add a glass-encased iron wire and wash the catalyst into the flask with 5 ml. acetic acid. Grease the upper half of the ground joint on the side arm and insert in flask. Weigh the sample of rosin acid (0.15–0.20 g.) to the nearest 0.0001 g. into a 9 x 15 mm. sample cup. If the sample is a powdered solid, moisten with a drop of acetic acid. Place the sample cup in the neck of the flask where it is supported by the end of the stoppper. Connect the flask to the gas buret using a thin film of grease on the ground glass joint, evacuate the apparatus and fill the same with hydrogen. Repeat the evacuation and filling cycle four times. The final filling with hydrogen should almost completely fill the reservoir at the base of the buret. When this condition is reached, the flow of hydrogen into the buret is stopped by closing the proper stopcocks.

A magnetic stirrer is placed below the reaction flask and started. The speed is regulated so that stirring is just sufficiently vigorous to break the liquid surface. At this point reduction of the catalyst starts. When the catalyst is completely reduced to platinum black as evidenced by no further change in the mercury level (this requires about 1 hour), the mercury surfaces in the buret are leveled using the mercury reservoir. This condition of complete reduction is determined by reading the leveled mercury volume at 30-minute intervals until the volume is constant within 0.1 ml.

When complete reduction of the PtO has been achieved, record the gas volume, temperature, and barometric pressure. The gas volume at this point should not be more than 45 ml. Rotate the side arm so as to allow the sample cup to drop into the acetic acid solution. Permit hydrogenation to proceed for about 16 hours. Read the final gas volume, temperature, and pressure. Temperature is read to the nearest 0.1° C. and the pressure to the nearest 1 mm. Correct the initial and final gas volumes to standard conditions, first adding the volume of the uncalibrated system.

$$\frac{\text{(Corrected initial volume} - \text{corrected final volume)} \; 0.00900}{\text{Grams of sample}} = \% \; H_2 \; \text{absorbed}$$

The cold-check test referred to in Example 1 measures the flexibility of the film and is determined by the ability of the film to resist the checking and cracking induced by sudden changes in temperature. By sanding hardness is meant the relative hardness of a lacquer film as measured in terms of the number of double sanding rubs which can be given before the sandpaper becomes clogged by the cuttings.

The cold-check cycles consisted of applying the lacquers containing each of the resins to wooden test panels which were then exposed to an elevated temperature of 120° F. for one hour and then to a low temperature of −6° F. for one hour, after which the lacquer surfaces were inspected at room temperature for checks and cracks. That procedure constituted one cycle.

The average number of cycles passed by a lacquer before any check appeared was taken as the cold-check flexibility of the lacquer.

For the sanding test referred to in Example 1, sufficient lacquer solution to yield a dry film 0.7 mil thick was sprayed on a metal panel and allowed to dry for 30 minutes at room temperature. Then the lacquer was promptly hand-sanded using #400–A sandpaper. The number of double sanding rubs possible before clogging of the paper became noticeable was taken as the sanding hardness value of the lacquer.

For the print resistance test also referred to in Example 1, 2-lb. and 5-lb. weights are placed over a 1-inch square piece of gauze resting on a 1-mil film which has dried for 6 hours. After 18 hours the weights and gauze are removed and the film inspected for thread impressions. If none are present, the film has passed the print resistance test for that weight.

What I claim and desire to protect by Letters Patent is:

1. A copolymer of vinyl acetate and a vinyl ester of a chemically stabilized rosin acid, said chemically stabilized rosin acid being selected from the group consisting of hydrogenated rosin acids and dehydrogenated rosin acids and said chemically stabilized rosin acid containing not more than 10% of resin acids having the carbon skeleton of abietic acid and having two ethylenic double bonds per molecule.

2. The copolymer of claim 1 in which the vinyl ester of a chemically stabilized rosin acid is a vinyl ester of a hydrogenated rosin acid.

3. The copolymer of claim 1 in which the vinyl ester of a chemically stabilized rosin acid is a vinyl ester of a dehydrogenated rosin acid.

4. The copolymer of claim 2 in which the hydrogenated rosin acid is at least 80% hydrogenated and contains substantially no resin acids having the carbon skeleton of abietic acid and having two ethylenic double bonds per molecule.

5. The process for copolymerizing vinyl acetate and a vinyl ester of a chemically stabilized rosin acid, said chemically stabilized rosin acid being selected from the group consisting of hydrogenated rosin acids and dehydrogenated rosin acids and containing not more than 10% of resin acids having the carbon skeleton of abietic acid and having two ethylenic double bonds per molecule, which comprises reacting between said vinyl compounds in the presence of a free radical producing catalyst.

6. The process of claim 5 in which the vinyl ester of a chemically stabilized rosin acid is a vinyl ester of a hydrogenated rosin acid.

7. The process of claim 5 in which the vinyl ester of a chemically stabilized rosin acid is a vinyl ester of a dehydrogenated rosin acid.

8. The process of claim 6 in which said hydrogenated rosin acid is at least 80% saturated and contains substantially no resin acids having the carbon skeleton of abietic acid and having two ethylenic double bonds per molecule.

9. The process of claim 8 in which the free radical producing catalyst is a peroxide polymerization catalyst.

10. The process of claim 8 in which said compounds are subjected to ultraviolet radiation.

11. The process of claim 8 in which said compounds are subjected to ultraviolet radiation in the presence of an activator selected from the group consisting of acetone, biacetyl, and di-tert-butyl peroxide.

References Cited in the file of this patent

UNITED STATES PATENTS

| | | |
|---|---|---|
| 2,614,997 | Robinson et al. | Oct. 21, 1952 |
| 2,615,011 | Robinson | Oct. 21, 1952 |

FOREIGN PATENTS

| | | |
|---|---|---|
| 395,478 | Great Britain | July 20, 1933 |

OTHER REFERENCES

Von Fischer: "Paint and Varnish Technology," New York, 1948, pages 108 and 109.